(12) United States Patent
Suzuki

(10) Patent No.: US 6,578,995 B2
(45) Date of Patent: Jun. 17, 2003

(54) VEHICULAR HEADLAMP AND VEHICLE PROVIDED WITH SAME

(75) Inventor: Yasufumi Suzuki, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 0 days.

(21) Appl. No.: 09/727,551

(22) Filed: Dec. 4, 2000

(65) Prior Publication Data

US 2001/0002879 A1 Jun. 7, 2001

(30) Foreign Application Priority Data

Dec. 3, 1999 (JP) ............................................ 11-345011
Dec. 3, 1999 (JP) ............................................ 11-345015

(51) Int. Cl.$^7$ ................................................ F21V 7/00
(52) U.S. Cl. ....................... 362/514; 362/517; 362/283; 362/516
(58) Field of Search ................................ 362/514, 277, 362/319, 43, 283, 512, 516, 520, 517, 518, 346, 465

(56) References Cited

U.S. PATENT DOCUMENTS

| | | | |
|---|---|---|---|
| 5,060,120 A | * 10/1991 | Kobayashi et al. | 362/465 |
| 5,599,085 A | 2/1997 | Tabata et al. | 362/72 |
| 5,711,590 A | * 1/1998 | Gotoh et al. | 362/43 |
| 5,975,723 A | * 11/1999 | Daumueller et al. | 362/297 |

FOREIGN PATENT DOCUMENTS

| | | |
|---|---|---|
| JP | 05-23216 | 4/1993 |
| JP | 07-195974 | 8/1995 |
| JP | 08-183385 | 7/1996 |
| JP | 11-078675 | 3/1999 |

* cited by examiner

Primary Examiner—Sandra O'Shea
Assistant Examiner—Bao Q Truong
(74) Attorney, Agent, or Firm—Foley & Lardner

(57) ABSTRACT

A lower reflector (3), disposed in a opening (23) of an upper reflector (2) to reflect conventionally unused light, is rotatable relative to the upper reflector (2), thereby changing a dispersed light-distribution pattern (WP) with respect to a fixed reference light-distribution pattern (LP), with an improvement in visibility when the vehicle negotiates a curve.

5 Claims, 11 Drawing Sheets

VEHICULAR HEADLAMP AND VEHICLE PROVIDED WITH SAME

BACKGROUND OF THE INVENTION

1. Field of the Invention

The present invention relates to a vehicular headlamp for a vehicle which changes the direction and range of illumination to thereby change the light-distribution pattern in response to the turning angle of the vehicle, and to a vehicle provided with such a vehicular headlamp.

2. Related Art

It is first noted that as used herein and in the accompanying drawings, the symbols L and R refer to the left side and right side, respectively, as seen by a front-facing driver, and the symbols U and D refer to the upward and downward directions, respectively, as seen from a front-facing driver.

The symbol Z—Z refers to a light axis, and so far as applicable, concurrently represents a reference plane that contains both the light axis and a vehicle-transversely level line crossing the light axis, the symbol HL-HR or HR-HL refers to a horizontal axis horizontal to the light axis Z—Z or a horizontal axis horizontal to a light-distribution axis, and the symbol VU-VD refers to a vertical axis vertical to the light axis Z—Z, or a vertical axis vertical to a light-distribution axis.

This type of vehicular headlamp generally has a light-source bulb, a movable reflector, and a drive means for causing rotation of the movable reflector, the drive means causing rotation of the movable reflector so as to cause a change in the illumination direction from the light-source bulb and the range of illumination thereof. Such a vehicular headlamp is noted, for example, in Japanese Patent Publication No. 5-23216, and Japanese Patent Application Laid-Open Publications No. 8-183385 and No. 11-78675.

In a vehicular headlamp of the past as noted above, all that is done is that part of the light-distribution pattern is changed

SUMMARY OF THE INVENTION

It is an object of the present invention to provide a headlamp for a vehicle capable of changing the dispersed light-distribution pattern with respect to a fixed reference pattern, resulting in an improvement in visibility in a curve, and a vehicle provided with such a vehicular headlamp.

The vehicular headlamp may project a low beam, and the light-distribution pattern as well as the fixed reference light pattern may be for the low beam. In this respect, the present invention addresses a vehicular headlamp for a vehicle that can make an effective use of a conventionally unused amount of light to form a dispersed light pattern without changing (decreasing) the amount of light to be used for the reference light pattern for low beam, and a vehicle provided with such a vehicular headlamp.

The present invention provides a vehicular headlamp comprising a reflector comprising a first reflective surface, and a shade region provided with a second reflective surface movable relative to the first reflective surface, and a light-source bulb disposed on a light axis of the first reflective surface.

Accordingly, the above-noted object can be achieved.

An aspect of the present invention is a vehicle provided with a vehicular headlamp, wherein the reflector is divided into two parts to be an upper reflector intersecting a reference plane including the light axis and a vehicle-transversely level line, and a lower reflector positioned below the reference plane, wherein the upper reflector is configured to have the first reflective surface and the shade region, light from the light-source bulb reflected threrefrom being provided to the vehicle as a reference light-distribution pattern, and the lower reflector is configured to have the second reflective surface, light from the light-source bulb reflected therefrom being provided as a dispersed light-distribution pattern relative to the reference light-distribution pattern.

As a result of this configuration, in a vehicle provided with a vehicular headlamp according to the present invention, the lower reflector is caused to rotate with respect to the upper reflector, so that the dispersed light-distribution pattern is changed with respect to the reference light-distribution pattern.

Another aspect of the present invention is a vehicle provided with a vehicular headlamp, wherein the reflector is divided into two parts to be an upper reflector intersecting a reference plane including the light axis and a vehicle-transversely level line, and a lower reflector positioned below the reference plane, with a line region interposed between the upper reflector and the lower reflector, wherein the upper reflector is configured to have the first reflective surface and the shade region, light from the light-source bulb reflected threrefrom being provided to the vehicle as a reference light-distribution pattern for low beam defined with a cut line formed by the line region, and the lower reflector is configured to have the second reflective surface, light from the light-source bulb reflected therefrom being provided as a dispersed light-distribution pattern for low beam relative to the reference light-distribution pattern.

As a result of this configuration, in a vehicle provided with a vehicular headlamp according to the present invention, the lower reflector is caused to rotate with respect to the upper reflector, so that the dispersed light-distribution pattern for low beam is changed with respect to the reference light-distribution pattern for low beam, making use of conventionally unused light.

BRIEF DESCRIPTION OF THE DRAWINGS

The above and other features will be better understood from the exemplary embodiments described below, taken together with the drawings, of which.

DETAILED DESCRIPTION OF THE PREFERRED EMBODIMENTS

Figure 1:
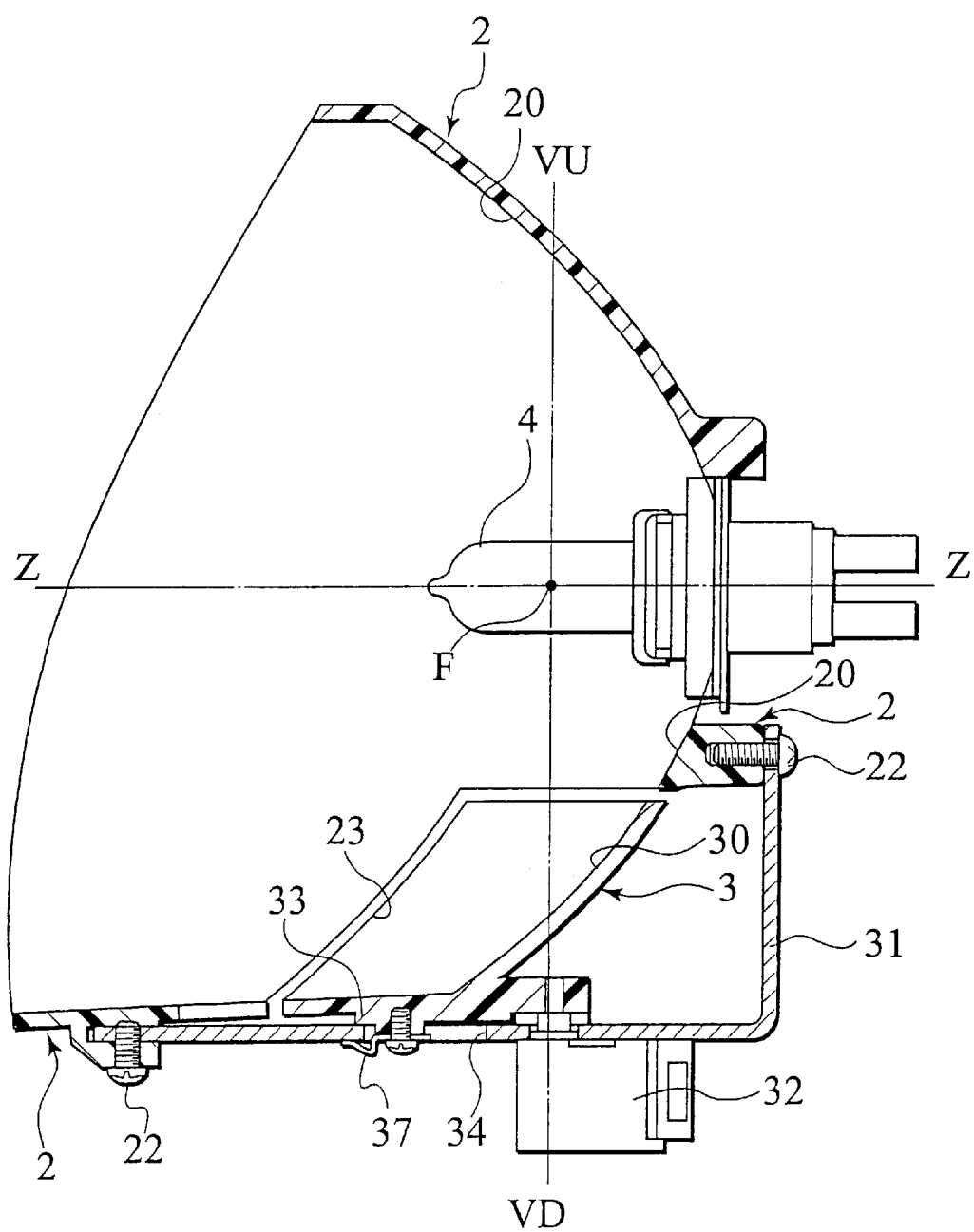
FIG. 1 is a vertical cross-sectional view of the main part (reflector) of a first embodiment of a vehicular headlamp according to the present invention, representing a cross-sectional view along the cutting line I—I of FIG. 2.

Embodiments of a vehicular headlamp according to the present invention are described in detail below, with references made to relevant accompanying drawings.

FIG. 1 to FIG. 6 illustrate a first embodiment of the present invention.

In these drawings, the reference numerals 2 and 3 denote the two sub-reflector sections, 2 being an upper reflector encompassing the light axis Z—Z, and 3 being a lower reflector below the light axis Z—Z.

Figure 2:
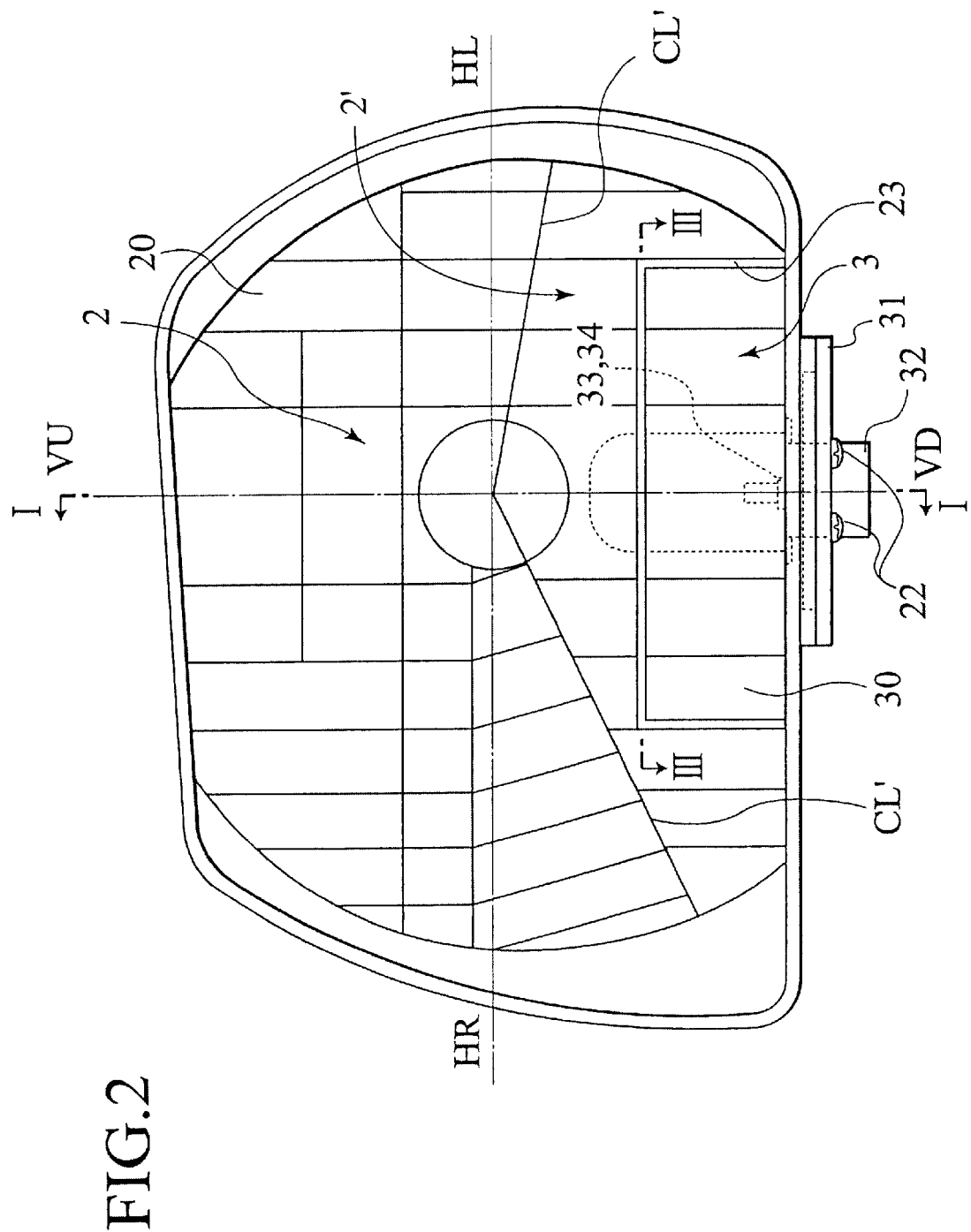
FIG. 2 is a front elevation of the main part of the first embodiment of the present invention.

The lower reflector 3 is divided from the lower part of the upper reflector 2, that is, the part below the horizontal axis HR-HL (or light axis Z—Z), so as to be substantially rectangular and symmetrical left-to-right about the vertical axis VU-VD when viewed from the front as shown in FIG. 2.

The lower reflector 3 is formed by cutting out of a part of the upper reflector 2 below the light axis Z—Z. As a result, a substantially rectangular aperture 23 is formed in the lower part of the upper reflector 2. The lower reflector 3 is thus disposed in aperture 23 of the upper reflector 2.

The upper reflector 2 is a fixed reflector fixed to a lamp housing (not shown in the drawing) via a bracket (not shown in the drawing). A single filament bulb 4 as a light source is detachably mounted at the substantially center part of the upper reflector 2. A reflective surface 20 forming a prescribed low-beam light-distribution pattern LP (used when passing opposing-direction vehicles) is provided on an inner surface of the upper reflector 2. This low-beam light-distribution pattern LP serves as the reference light-distribution pattern. The low-beam light-distribution pattern LP has a shape indicated by the solid line and part of the broken line in FIG. 4.

The lower reflector 3 is rotatable with respect to the upper reflector 2. As shown in FIG. 1, the two ends of a substantially L-shaped (viewed from the side thereof) mounting bracket 31 are fixed to the upper and lower edges of the aperture 23 of the upper reflector 2 by screws 22. The mounting bracket 31 is mounted so that it straddles across the upper edge and the lower edge of the aperture 23 of the upper reflector 2. A drive motor 32 is fixed at the substantially central part of the mounting bracket 31 as a drive means. The lower reflector 3 is fixed to a drive shaft of the drive motor 32. As a result, the lower reflector 3 can rotate with respect to the upper reflector 2. The lower reflector 3 can rotate to the left and right about a vertical axis VU-VD, which passes a vicinity of a focus F of either one or each of the reflective surface 20 of the upper reflector 2 and a reflective surface 30 of the lower reflector 3. The reflective surface 30 of the lower reflector 3 makes use of a conventionally unused amount of light to form a dispersed light-distribution pattern WP. The dispersed light-distribution pattern WP has a shape indicated by the solid line protruding outward from the broken line of FIG. 4.

A stepping motor is used as the drive motor 32. This stepping motor first causes a driven member (in this example, the lower reflector 3) to come into contact with a stopper in one direction, and is then stepped in the reverse direction by a prescribed number of steps to achieve a zero (reference) position setting, after which the motor is driven forward or reverse by a number of steps in accordance with information (in this example, the turning angle of the vehicle).

A guide mechanism (33+34+37) is interposed between the lower reflector 3 and the mounting bracket 31. The guide mechanism is formed by a guide convex 33 projecting from the lower reflector 3, a plate spring 37 fixed to the guide convex 33, and a guide grooves 14 provided in the shape of an arc about the vertical axis VU-VD in the mounting bracket 31, so that the guide convex 33 and the plate spring 37 slidably pinch an edge of the guide groove 34.

The above-noted upper reflector 2, lower reflector 3, single filament light source bulb 4, drive motor 32, and guide mechanism elements 33 and 34 are disposed within a lamp chamber (not shown in the drawing) delineated by a lamp housing and a front lens or front cover (not shown in the drawing), thereby forming a vehicular headlamp, which is installed at the left and right of the front of a vehicle. The upper reflector 2, along with the lower reflector 3, is mounted into the lamp housing via an intervening left-right light-axis adjustment mechanism (not shown in the drawing) and an intervening up-down light-axis adjustment mechanism (not shown in the drawing), so as to enable adjustment of the light axis left-and-right and up-and-down.

The vehicular headlamp according to the fist embodiment configured as described above is used as follows.

Figure 3:
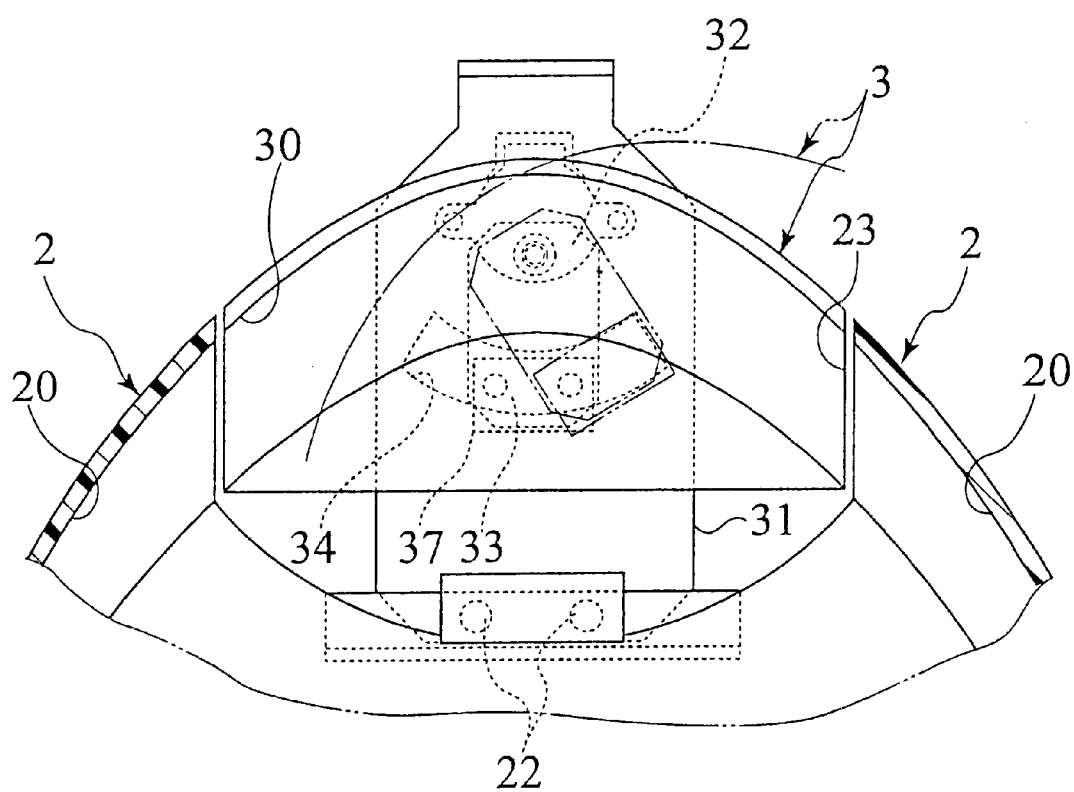
FIG. 3 is a cross-sectional view along the cutting line III—III of FIG. 2.
Figure 4:
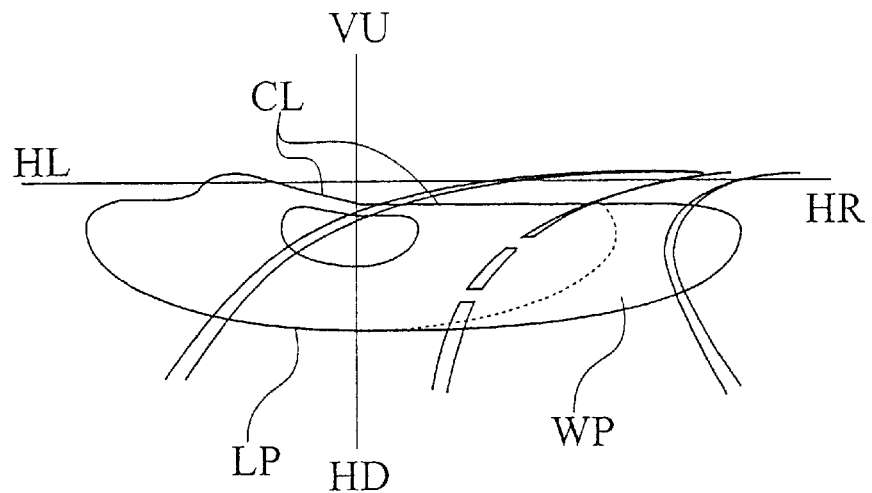
FIG. 4 is a drawing illustrating the light-distribution pattern through a right curve.
Figure 5:
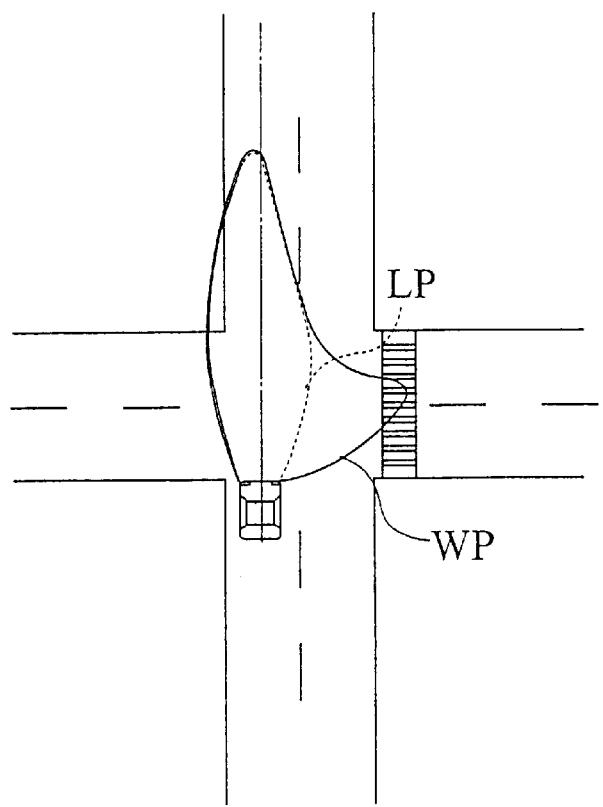
FIG. 5 is a drawing illustrating the light-distribution pattern through a right curve at a cross point.
Figure 6:
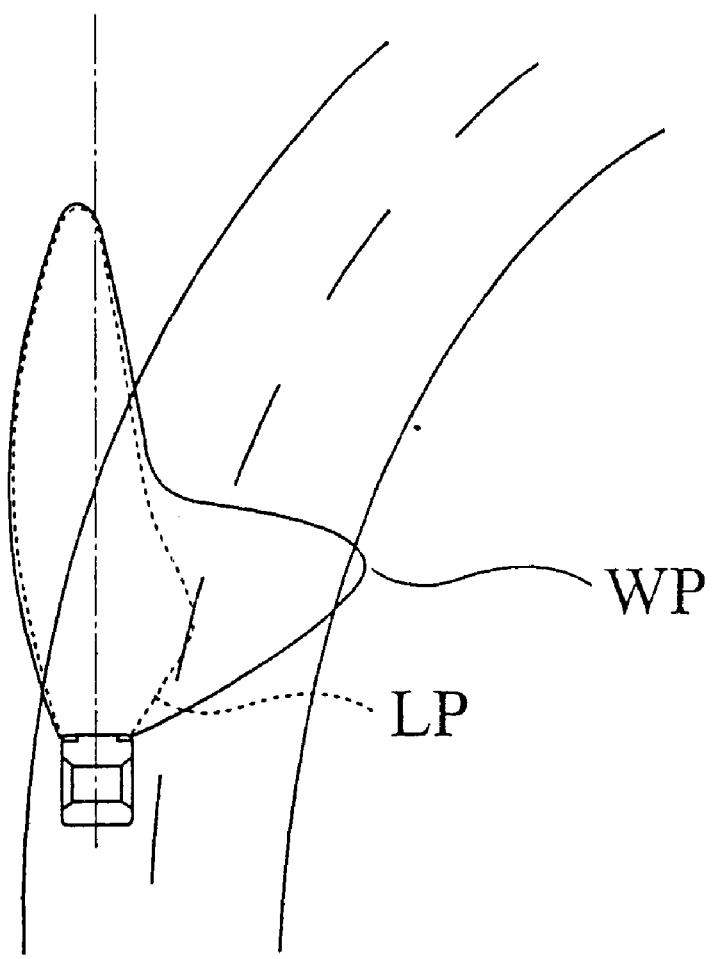
FIG. 6 is a plan illustrating the light-distribution pattern through a right curve.

With the vehicle traveling in a straight line, the lower reflector is at the neutral position, as shown in FIG. 1 to FIG. 3. When the single filament light source bulb 4 is lighted, light therefrom is reflected by the reflective surface 20 of the upper reflector 2 and the reflective surface 30 of the lower reflector 3, so that a prescribed low-beam light-distribution pattern LP as shown by the solid line and partial broken of FIG. 4 and the broken lines of FIG. 5 and FIG. 6 is obtained. Under this condition, the dispersed light-distribution pattern WP is positioned within the low-beam light-distribution pattern LP.

Next, if the vehicle negotiates a right curve or turns right at a cross point, the drive motor 32 is driven in accordance with information of the turning angle of the vehicle, so that the lower reflector 3 is rotated toward the right through a prescribed commanded angle about the vertical axis VU-VD. As a result, as shown in FIG. 4 to FIG. 6, the dispersed light-distribution pattern WP is swung to the right from the position indicated by the broken line of the light-distribution pattern LP for low beam, to the position indicated by the solid line, along the curve. In a similar manner, if the vehicle negotiates a left curve or turns left at a cross point, the lower drive motor 32 is driven in accordance with information of the turning angle of the vehicle, so that the lower reflector 3 is rotated through a prescribed commanded angle toward the left, about the vertical axis VU-VD. The result is that the dispersed light-distribution pattern WP is swung leftward of the low beam light pattern LP, along the curve.

Thus, in the vehicular headlamp according to the first embodiment of the present invention, by causing the lower reflector 3 to rotate relative to the upper reflector 2, the dispersed light-distribution pattern WP is changed with respect to the low-beam light-distribution pattern LP of the fixed reference light-distribution pattern, with a resultant improvement in visibility of pedestrians and obstacles on a road at night.

In particular, in the first embodiment, because the lower reflector 3 is rotatably disposed in the aperture 23 of the upper reflector 2, the area surrounding the movable lower reflector 3 is surrounded by the fixed upper reflector 2, so that even if the lower reflector 3 rotates, there is no change in the outer shape of the upper reflector 2. Thus, because the outer shape of the shining reflector does not change, the design of the light-emitting surface is not sacrificed. Furthermore, of the upper reflector 2, the location at which the lower reflector 3 is disposed is cut out, so as to form the aperture 23, so that the rigidity of the upper reflector 2 is not lost.

Additionally, in the first embodiment, because the two ends of the mounting bracket 31 are fixed to the upper and lower edges of the aperture 23 of the upper reflector 2, that is, because the mounting bracket 31 is supported at both ends, the rigidity (for example, torsional rigidity) of the mounting bracket 31 is great. Furthermore, because the lower reflector 3 is also supported at both ends thereof by the highly rigid mounting bracket 31, via the drive motor 32 and the guide mechanism elements 33 and 37, the precision of the light distribution is improved, and there is an improvement in immunity to vibration of the vehicle.

Further, in the first embodiment, because the lower reflector 3 is rotatable to the left and right about the vertical axis VU-VD passing a vicinity of the focus F of the reflective surface(s) 20 and/or 30 of the upper and/or lower reflector(s) 2 and/or 3, even when the lower reflector 3 is rotated, the focus F is kept in position, facilitating the light-distribution control.

Figure 7:
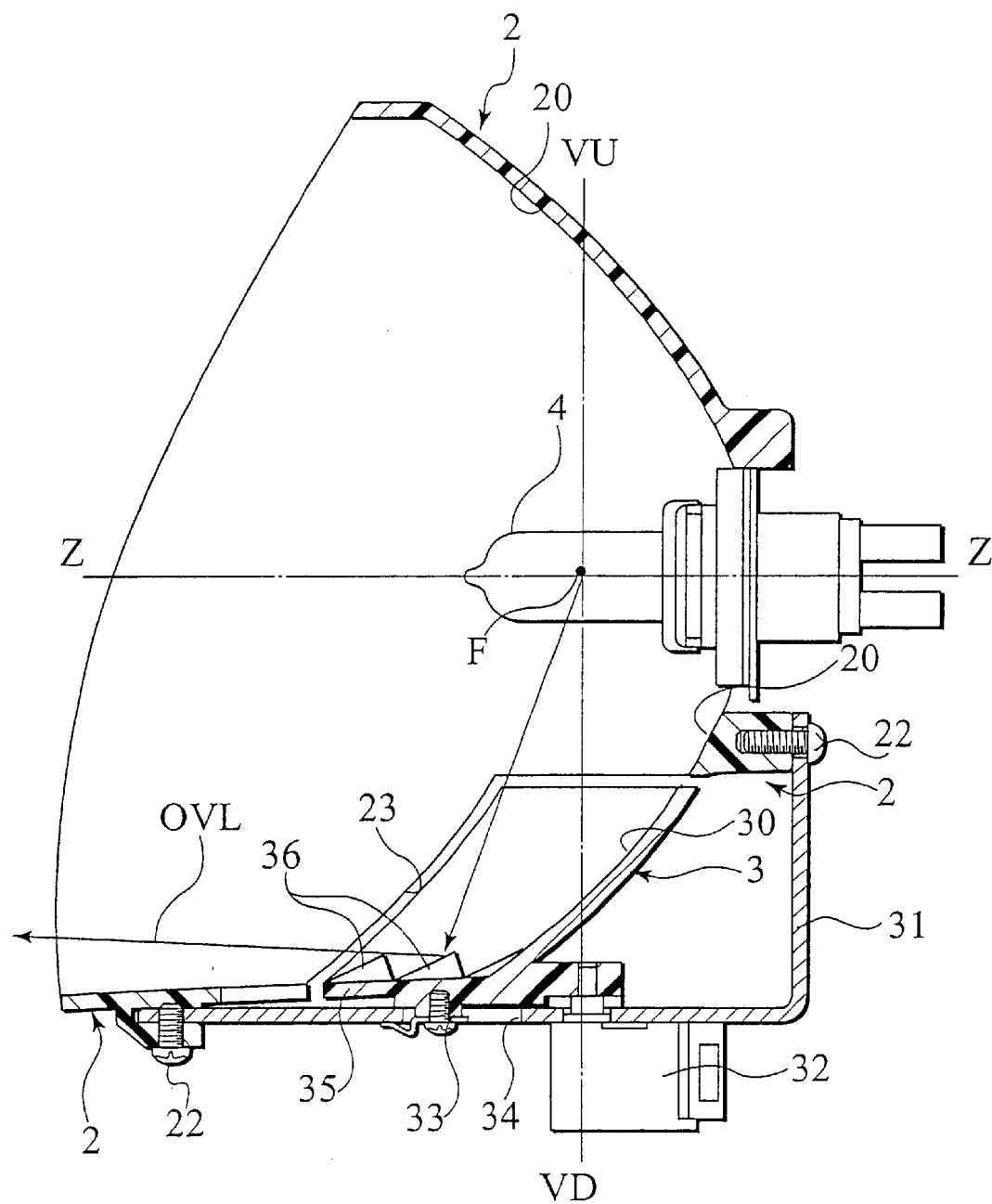
FIG. 7 is a vertical cross-sectional view of the main part (reflector) of a second embodiment of a vehicular headlamp according to the present invention.
Figure 8:
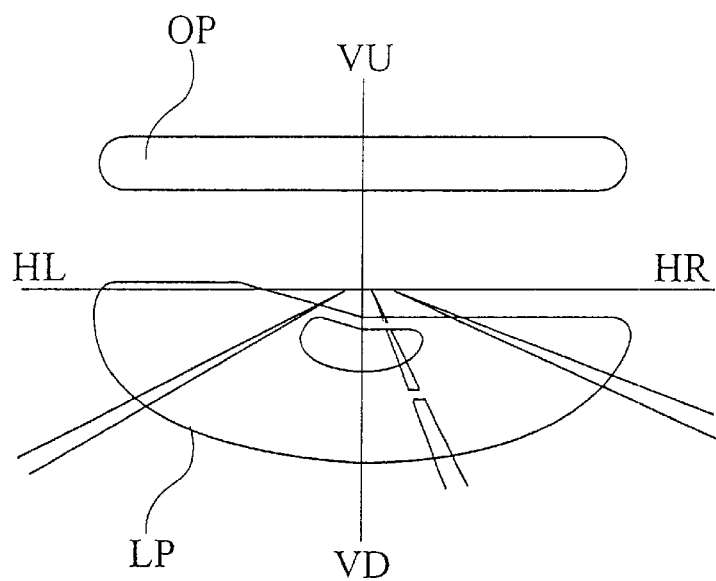
FIG. 8 is a drawing illustrating the light-distribution pattern in a straight running.
Figure 9:
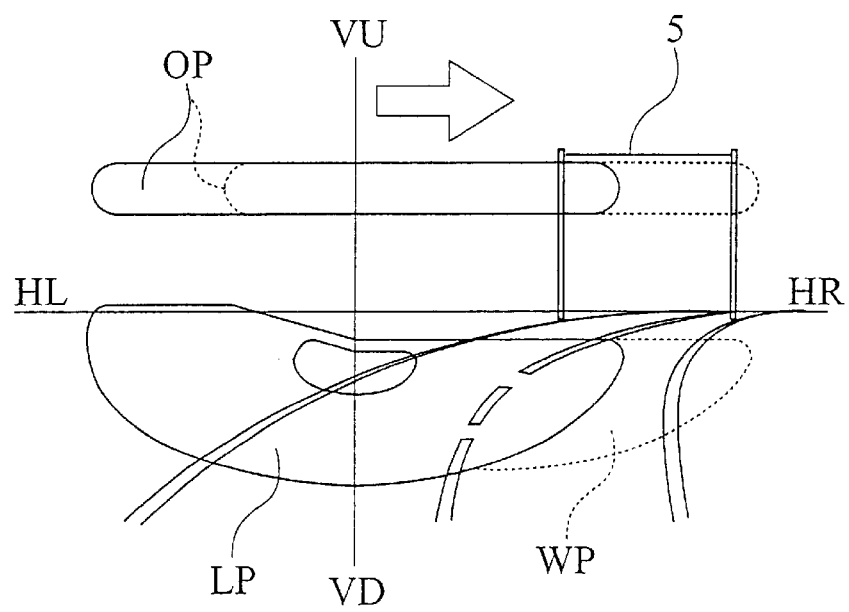
FIG. 9 is a drawing illustrating the light-distribution pattern through a right curve.

FIG. 7 to FIG. 9 show a second embodiment of a vehicular headlamp provided in a vehicle according to the present invention, in elements corresponding to elements in FIG. 1 to FIG. 6 are assigned the same reference numerals.

The second embodiment is different from the first embodiment simply in that it has, on an optically inner side (upside in FIG. 7) of a horizontal lower wall 35 of a lower reflector 3, a plurality of triangle-wavy raised reflective elements 36 for reflecting light from a single filament light-source bulb 4 to illuminate an overhead sign for the vehicle.

The vehicular headlamp according to the second embodiment exhibits like effects to the first embodiment.

In addition, in the second embodiment, in which the reflective elements 36 are provided on the inner side of the horizontal lower wall 35 of the lower reflector 3, when the single filament light-source bulb 4 is lighted, light therefrom is reflected by slopes of the reflective elements 36, and the reflected light serves as an OVL (overhead sign lighting) that, as in FIG. 8, illuminates a location higher than a low beam light-distribution pattern LP, with an overhead sign lighting light-distribution pattern OP, which is dispersed wider both leftward and rightward, providing an increased visibility of an overhead sign for the vehicle.

Further, when the vehicle negotiates a right curve, as shown in FIG. 9, a dispersed light-distribution pattern WP is swung to the right from a position of the low beam light-distribution pattern LP indicated by solid line to a position indicated by broken line, along the curve, and concurrently, also the OVL light-distribution pattern is swung to the right from a position indicated by solid line to a position indicated by broken line, permitting an earlier eye-catch of an overhead sign 5 provided in course of the curve.

FIG. 10 to FIGS. 13(A), (B) and (C) show third embodiment of a vehicular headlamp provided in a vehicle according to the present invention, in elements corresponding to described elements are assigned the same reference numerals.

The third embodiment is different from the first embodiment in that upper and lower reflectors 2 and 3 have a separation line therebetween straight extending in parallel to the reference plane containing the light axis Z—Z so that a reflective surface 30 of the lower reflector 3 is positioned below those lines CL' which provide a cut line CL of a low-beam reference light-distribution pattern LP formed by a reflective surface 20 of the upper reflector 2, and that a guide mechanism (50+51) is forwardly set off relative to a vertical axis VU-VD for the lower reflector 3 and/or the upper reflector 2 to rotate thereabout.

Figure 13A:
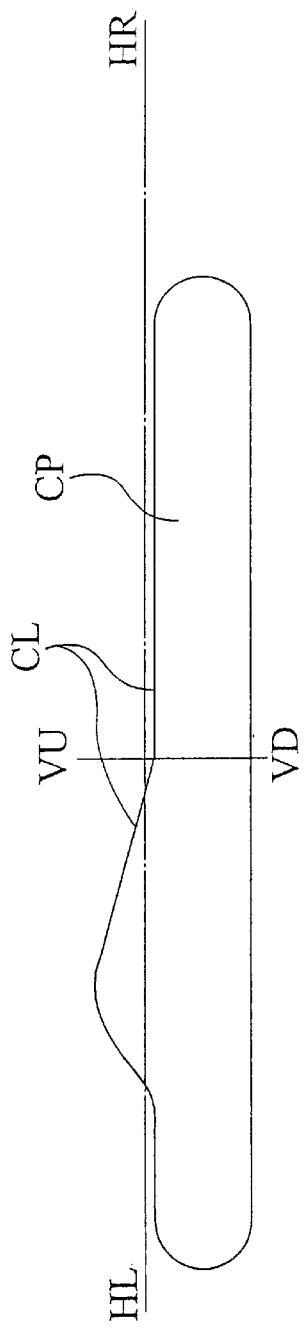
FIG. 13A, FIG. 13B, and FIG. 13C are drawings illustrating the light-distribution pattern for low beam by the upper reflector, the dispersed light-distribution pattern by the lower reflector, and a synthesized light-distribution pattern therebetween, respectively.

The reflective surface 20 on an inside of the upper reflector 2 is configured to form the low-beam reference light-distribution pattern LP, which is shown in FIG. 13A. The reflective surface 30 on an inside of the lower reflector 3 is configured for utilization of conventionaly unused light to form a dispersed light-distribution pattern WP shown in FIG. 13B, to be combined with the reference light-distribution pattern LP of FIG. 13A, thereby to provide a synthesized light-distribution pattern shown in FIG. 13C.

Figure 10:
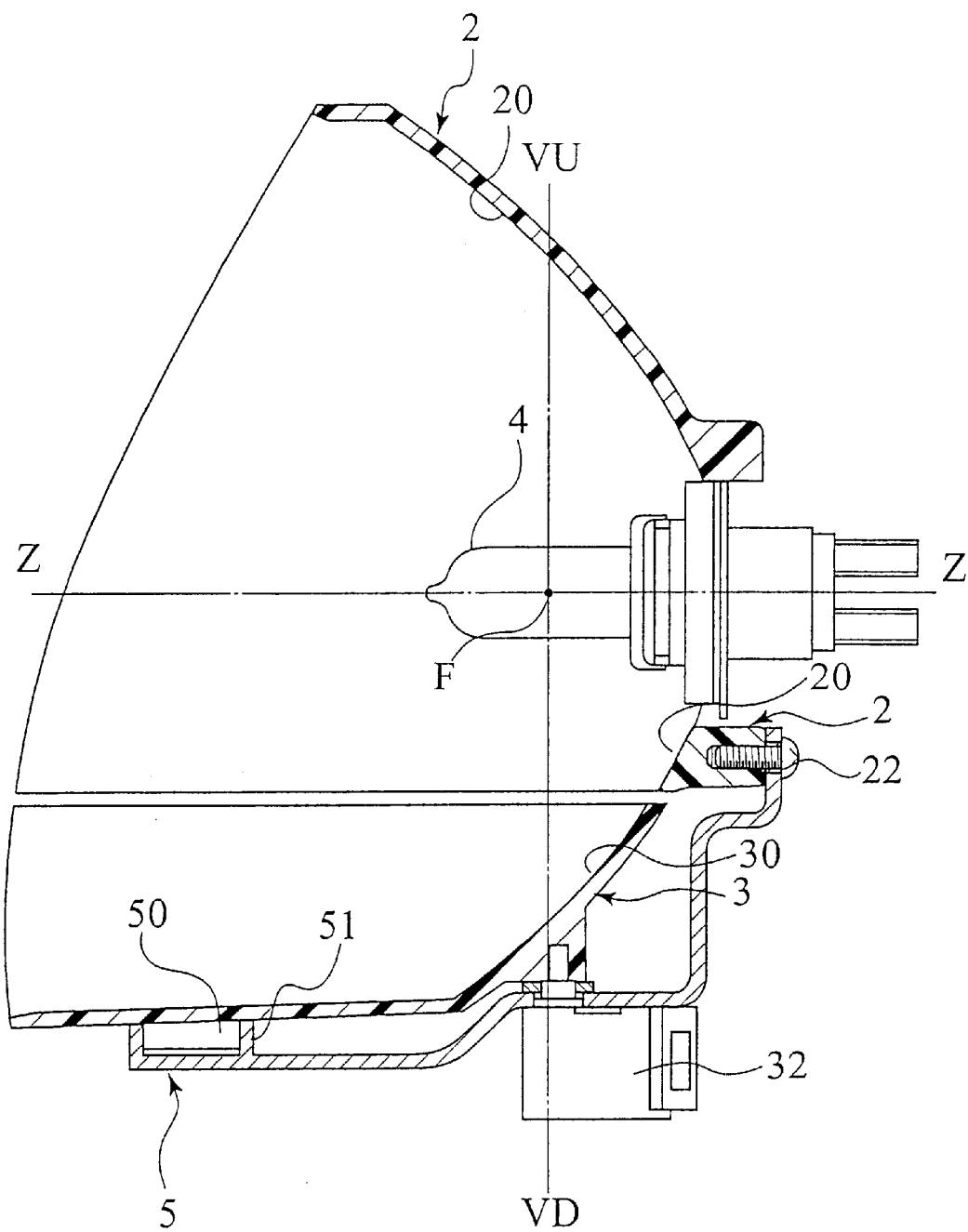
FIG. 10 is a vertical cross-sectional view of the main part (reflector) of a third embodiment for a vehicular headlamp according to the present invention, representing a cross-sectional view along the cutting line X—X of FIG. 11.
Figure 11:
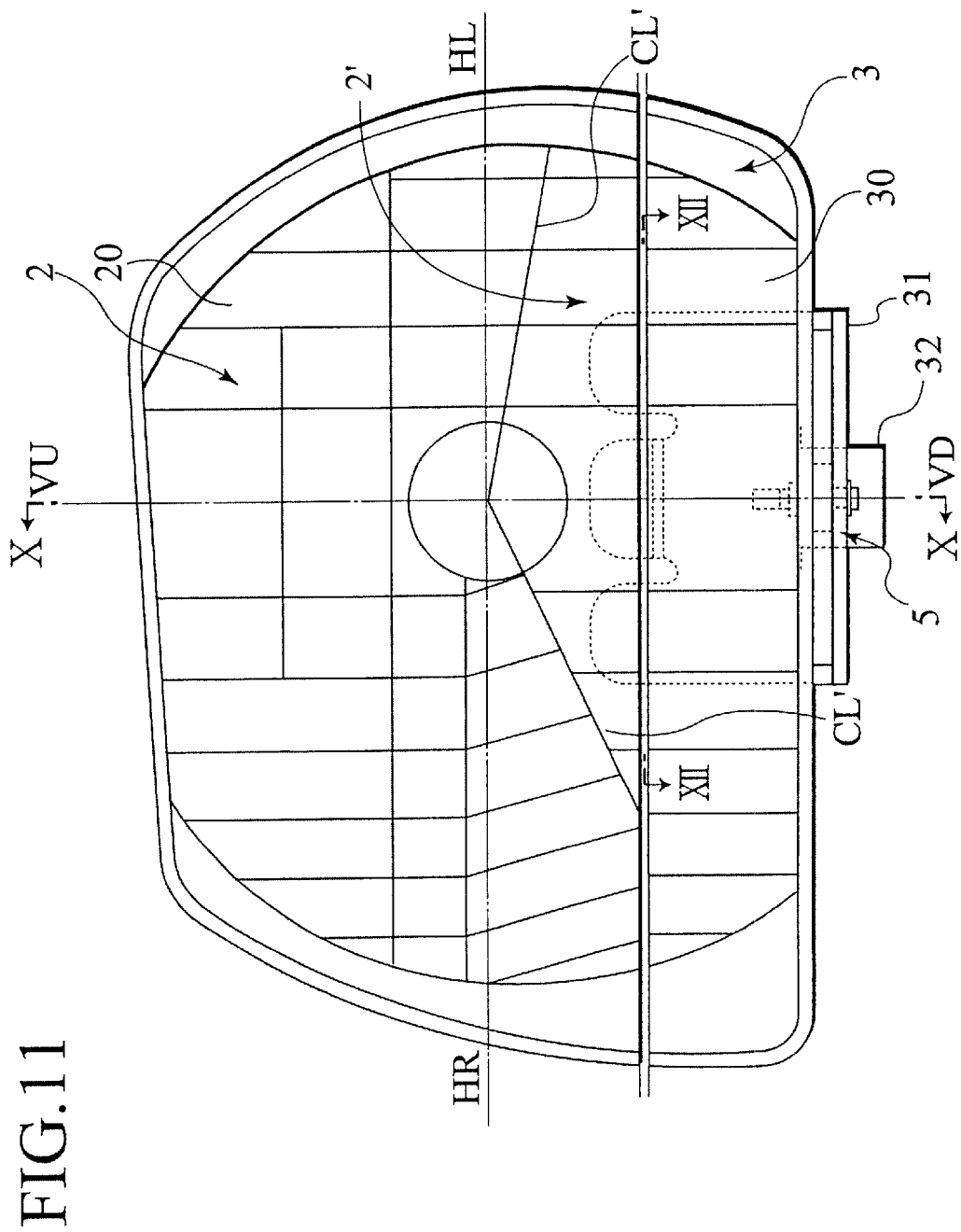
FIG. 11 is a front elevation of the main part of the third embodiment of the present invention.
Figure 12:
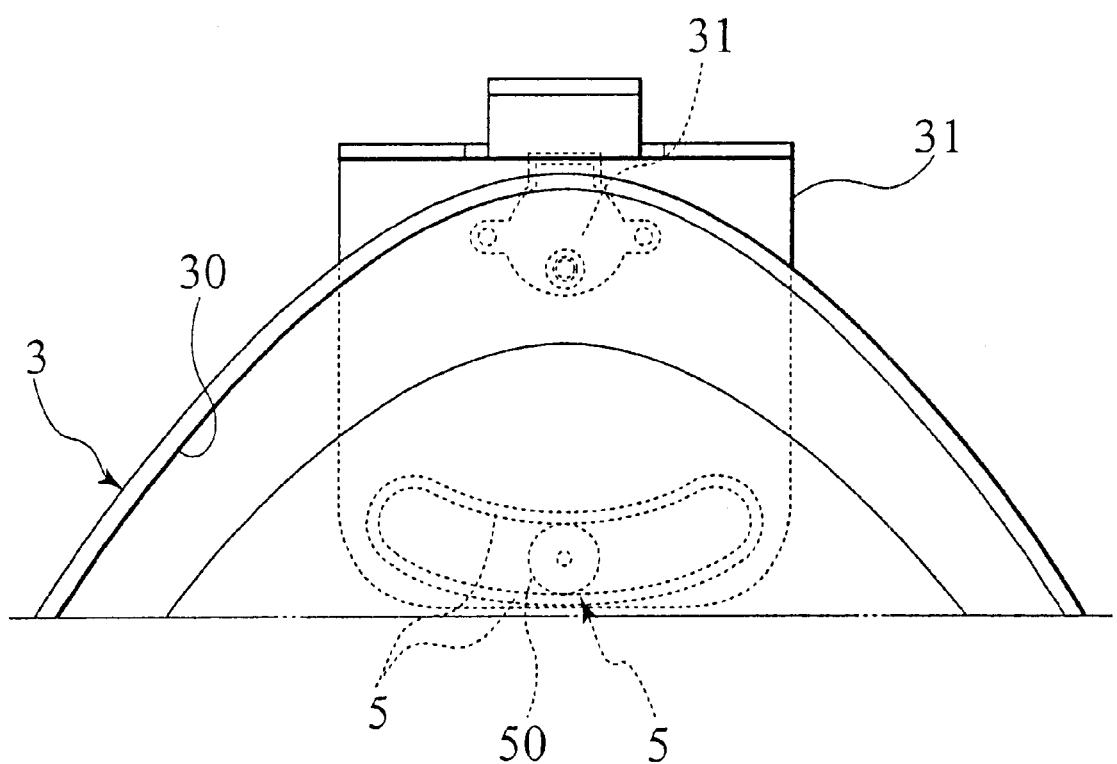
FIG. 12 is a cross sectional view along the cutting line XII—XII of FIG. 11.
Figure 13B:
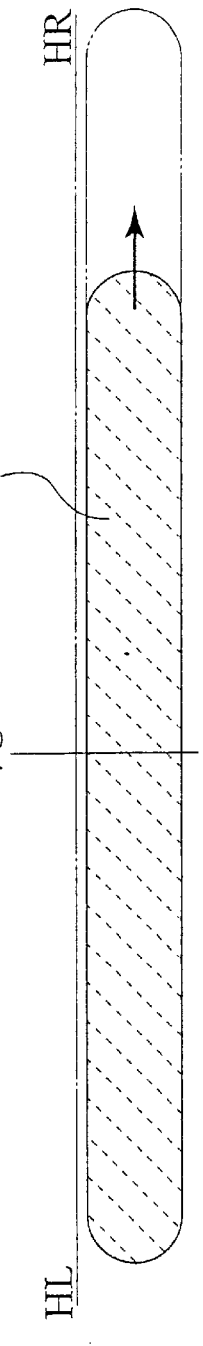

With the vehicle traveling in a straight line, the lower reflector 3 is at the neutral position, as shown in FIG. 10 to FIG. 12. When the single filament light source bulb 4 is lighted, light therefrom is reflected by the reflective surface 20 of the upper reflector 2 and the reflective surface 30 of the lower reflector 3, so that a prescribed low-beam light-distribution pattern LP as shown in FIG. 13A and FIG. 4, when a dispersed light-distribution pattern WP in FIG. 13B is positioned within the low-beam light-distribution pattern LP in FIG. 4, refer to FIG. 13C.

Figure 13C:
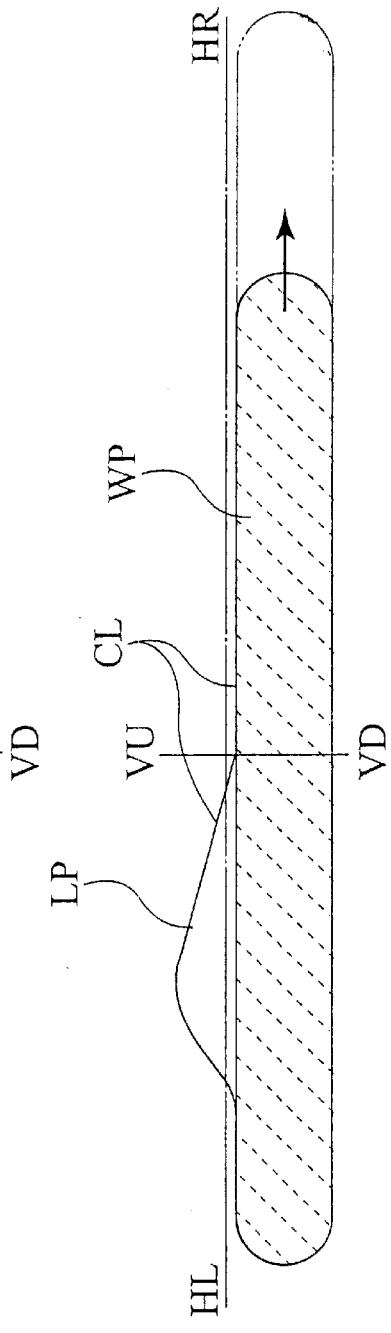

If the vehicle negotiates a right curve or turns right at a cross point, a drive motor 32 is driven in accordance with information of the turning angle of the vehicle, so that the lower reflector 3 is rotated toward the right through a commanded angle about a vertical axis VU-VD. As a result, as shown in FIG. 13B, FIG. 13CC, FIG. 5, and FIG. 6, the dispersed light-distribution pattern WP is swung to the right from the position indicated by the broken line of the light-distribution pattern LP for low beam, to the position indicated by the solid line, along the curve. In a similar manner, if the vehicle negotiates a left curve or turns left at a cross point, the lower drive motor 32 is driven in accordance with information of the turning angle of the vehicle, so that the lower reflector 3 is rotated through a commanded angle toward the left, about the vertical axis VU-VD. The result is that the dispersed light-distribution pattern WP is swung leftward of the low beam light pattern LP, along the curve.

The guide mechanism (50+51) is disposed between a front part of the lower reflector 3 and a lower end of a mounting bracket 31, at a location spaced apart from the rotation axis (vertical axis VU-VD) of the lower reflector 3. This guide mechanism is made up by a guide wheel 50 rotatably mounted via bearings to a downside of the front part of the lower reflector 3, and a guide rail 51 integrally formed or provided, in a arc form with respect to the vertical axis VU-VD, on an upside of the lower end of the mounting bracket 31, and the guide wheel 50 is adapted to roll on the guide rail 51. The guide mechanism serves as a support mechanism such that an outer periphery of the guide wheel 50 and an inner surface of the guide rail 51 bear radial loads, and a downside of the lower reflector 3 and an upside of the guide rail 51 bear thrust loads. The guide mechanism further serves as a stopper for a 0 setting of the stepping motor.

As will be seen, the foregoing embodiments can be combined in anatbitary manner to obtain corresponding effects.

In the foregoing embodiments, in the case of the low-beam light-distribution pattern LP, by using the lower reflector 3, which has not particularly been used in the past, it is possible to maintain the amount of light from the basic low-beam light-distribution pattern LP while making sufficient use of light from the light source bulb 4. The basic low-beam light-distribution pattern LP was formed above the line CL' (see FIG. 2) that forms the cutting line CL (see FIG. 4) of the reflectors 2 and 3. For this reason, of the reflectors 2 and 3, the part below the cutting line CL' (a shade region 2') was not used, light striking this lower reflector not being actively used. In particular, when using a discharge lamp as the light-source bulb, if the discharge lamp is a new light source emitting a large amount of light, by making use of the part of the reflectors 2 and 3 merely above the cutting line CL', a sufficient amount of light was obtained, and the amount of light not used was large. With the first and second embodiments of the present invention, however, because light not formerly used is actively used, it is possible as noted above to make sufficiently effective use of the light from the single filament light source bulb 4, while maintaining the amount of light in the basic low-beam light-distribution pattern LP.

Moreover, in the embodiments described, the mounting bracket 31 fixed at two ends thereof may be a cantilever structure, and the lower reflector 3 held at two ends thereof to the mounting bracket 31 may be held in a cantilever manner.

Further, in the embodiments, the light source composed of the single filament light-source bulb 4 may comprise a different light-source bulb, for example, a double-filament light-source lamp with no light-blocking plate within the glass envelope, or a discharge lamp (such as a high-intensity discharge lamp HID, a high-pressure metallic vapor discharge lamp such as a metal halide lamp). In this case, the reference light-distribution pattern can be either the low-beam light-distribution pattern LP or the high-beam light-distribution pattern.

The low beam light-distribution pattern LP, dispersed light-distribution pattern WP, and OVL light-distribution pattern OP may be controlled simply by the reflective surfaces 20 and 30, or by combination of them with a front lens, or by mere use of the front lens.

In the above-described embodiments, the description is for the case in which the vehicular headlamp is applied as a headlamp for use in an area in which driving is done on the left side of the road, it will be understood that that the structure and the light-distribution patterns and the like would be reversed left-to-right for use in an area in which driving is done on the right side of the road.

While preferred embodiments of the present invention have been described using specific terms, such description is for illustrative purposes, and it is to be understood that changes and variations may be made without departing from the spirit or scope of the following claims

What is claimed:

1. A vehicular headlamp comprising:
    a reflector comprising a first reflective surface, and a shade region provided with a second reflective surface movable relative to the first reflective surface; and
    a light-source bulb disposed an a light axis of the first reflective surface, wherein
    the reflector is divided into two parts to be an upper reflector intersecting a reference plane including the light axis and a vehicle-transversely level line, and a lower reflector positioned below the reference plane, with a line region interposed between the upper reflector and the lower reflector, wherein
    the upper reflector is configured to have the first reflective surface and the shade region, light from the light-source bulb reflected therefrom being provided to the vehicle as a reference light-distribution pattern for low beam defined with a out line formed by the line region, and
    the lower reflector is configured to have the second reflective surface, light from the light-source bulb reflected therefrom being provided as a dispersed light-distribution pattern for low beam relative to the reference light-distribution pattern, the lower reflector being rotatable about a vertical axis vehicle to a focus of one of the first and second reflective surfaces and rotatable relative to a bracket fixed to the upper reflector.

2. A vehicle provided with a vehicular headlamp according to claim 1,
    wherein the second reflective surface comprises a reflective element for overhead sign illumination of the vehicle.

3. A vehicle provided with a vehicular headlamp according to claim 1, wherein the lower reflector is rotatable about a vertical axis vehicle to a focus of the first and second reflective surfaces.

4. A vehicle provided with a vehicular headlamp according to claim 1, wherein the lower reflector is rotatable relative to a bracket fixed to the upper reflector and guidably supported by the bracket.

5. A vehicular headlamp comprising:
    a reflector comprising a first reflective surface, and a shade region provided with a second reflective surface movable relative to the first reflective surface; and
    a light-source bulb disposed on a light axis of the first reflective surface, wherein
    the second reflective surface has a substantially parabolic shape and extends in substantially the same parabolic plane as the first reflective surface when the second reflective surface is at a neutral position, wherein
    the reflector is divided into two parts to be an upper reflector intersecting a reference plane including the light axis and a vehicle-transversely level line, and a lower reflector positioned below the reference plane, with a line region interposed between the upper reflector and the lower reflector, wherein
    the upper reflector is configured to have the first reflective surface and the shade region, light from the light-source bulb reflected therefrom being provided to the vehicle as a reference light-distribution pattern for low beam defined with a cut line formed by the line region, and
    the lower reflector is configured to have the second reflective surface, light from the light-source bulb reflected therefrom being provided as a dispersed light-distribution pattern for low beam relative to the reference light-distribution pattern, the lower reflector being rotatable about a vertical axis vehicle to a focus of one of the first and second reflective surfaces.

* * * * *